United States Patent
Agrawal et al.

(10) Patent No.: US 8,274,573 B2
(45) Date of Patent: Sep. 25, 2012

(54) METHOD AND SYSTEM FOR GENERATING HIGH TEMPORAL RESOLUTION VIDEO FROM LOW TEMPORAL RESOLUTION VIDEOS

(75) Inventors: Amit K. Agrawal, Somerville, MA (US); Ashok Veeraraghavan, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 416 days.

(21) Appl. No.: 12/751,460

(22) Filed: Mar. 31, 2010

(65) Prior Publication Data
US 2011/0242341 A1 Oct. 6, 2011

(51) Int. Cl.
*H04N 5/225* (2006.01)
(52) U.S. Cl. .................................................. 348/218.1
(58) Field of Classification Search .................. None
See application file for complete search history.

(56) References Cited

U.S. PATENT DOCUMENTS 7,580,620 B2    8/2009    Raskar

*Primary Examiner* — Chieh M Fan
*Assistant Examiner* — Angel L Garces-Rivera
(74) *Attorney, Agent, or Firm* — Dirk Brinkman; Gene Vinokur

(57) ABSTRACT

Embodiments of the invention disclose a system and a method for generating an output video having a first temporal resolution from input videos acquired synchronously of a scene by at least three cameras, wherein each input video has a second temporal resolution, wherein the second temporal resolution is less than the first temporal resolution. The method obtains frames of each input video, wherein the frames are sampled according to a code selected such that an integration time of the corresponding camera is greater than a frame time of the output video. Next, the method combines intensities of pixels of corresponding frames in a linear system; and solves the linear system independently for each corresponding frame to generate the output video.

20 Claims, 4 Drawing Sheets

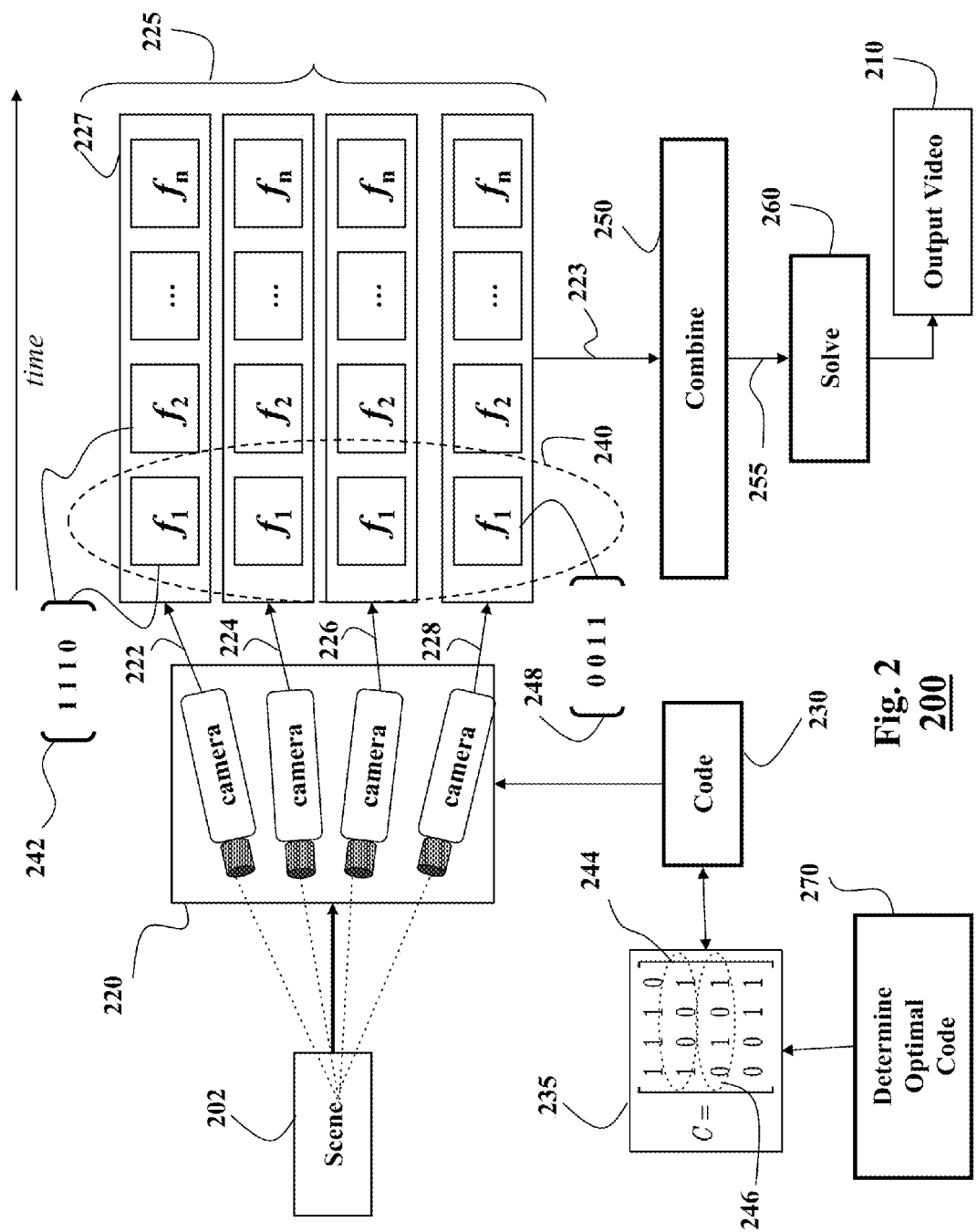

METHOD AND SYSTEM FOR GENERATING HIGH TEMPORAL RESOLUTION VIDEO FROM LOW TEMPORAL RESOLUTION VIDEOS

FIELD OF THE INVENTION

This invention relates generally to a high temporal resolution video, and more particularly to generating the high temporal resolution video from low temporal resolution videos.

BACKGROUND OF THE INVENTION

A video camera has limited temporal resolution determined by a frame rate and an exposure time. Temporal events of a scene occurring at a rate faster than the frame rate of the camera can cause aliasing and blur in acquired frames of the videos due to finite integration time of a sensor of the camera. The blur can be caused, e.g., by motion of objects and/or by a temporal change of intensities in the scene, e.g., a flickering light or a display screen. The goal of temporal super-resolution (SR) is to generate the high temporal resolution video without aliasing and blur.

A frame time $T_f$ of the camera, i.e., inverse of the frame rate, determines how fast the sensor samples the temporal variations at each pixel, while the integration time T determines how long the sensor of the camera integrates at that sampling rate. Let $T_f^{nq}$ be Nyquist frame time required to avoid aliasing, i.e., the sensor acquires a sample at least every $T_f^{nq}$ seconds to avoid aliasing.

Depending on the relationship between the integration T, the frame time $T_f$ and the Nyquist frame time $T_f^{nq}$, the acquired frames of the video can either have blur, aliasing, or a combination of both. The well-known "wagon wheel" effect happens when $T_f > T_f^{nq}$, i.e., the wheel appears to be rotating in a reverse direction due to temporal aliasing. The temporal aliasing can occur concurrently with the blur when the integration time T increases.

A high speed camera avoids both the blur and the aliasing by sampling faster than the Nyquist frame rate, while keeping the integration time T sufficiently small. However, the high speed camera has a fundamental light capture limit. If the frame rate is f frames/sec, then the exposure duration cannot be greater than 1/f sec. In addition, commercial high speed cameras are expensive, and require a large bandwidth and local memory.

Multiple Cameras

Point Sampling

FIG. 1A shows a conventional point sampling method to generate an output video 110 having a high temporal resolution from multiple input videos having low temporal resolutions. Using N cameras 120 each with a frame rate f, the output video with an effective frame rate of Nf can be recovered by staggering the start of exposure window of each camera by $$\frac{1}{Nf}$$

and interleaving 130 the acquired frames in a chronological order.

Each of the N cameras has a frame time $T_f^{in}$ and integration time $T^{in}=T_f^{in}/N$. The output video has the frame time $T_f^{out}=T_f^{in}/N$. To avoid blur, $T^{out}=T^{in}$ and $T^{in}$ is small.

The advantage of the point sampling method is that the reconstruction process simply involves interleaving the acquired frames, thus avoiding reconstruction artifacts. However, the exposure time of each camera is $$\frac{1}{Nf},$$

i.e., similar to an equivalent high speed camera, and, thus the point sampling method is light-inefficient.

Box Sampling

FIG. 1B shows a conventional box sampling method that combines several low temporal resolution videos 120 to generate the high temporal resolution video 110 using an optimization framework. That method allows a finite integration time to collect more light, which leads to motion blur in the videos 120. The finite integration time acts as a low pass box filter and suppresses high temporal frequencies. The box sampling uses regularization to solve the resulting ill-posed linear system 140 and to suppress ringing artifacts. However, recovering the lost high frequency information is inherently an ill-posed problem. Moreover, using N cameras, it is difficult to achieve the temporal SR by a factor of N. In addition, the reconstruction requires solving a huge sparse linear system (with million variables) for a video of a modest size.

To achieve the temporal SR, it is important to consider both the increase in frame rate and/or the decrease in frame time $T_f$, and decrease in the integration time T. For example, the decrease of the integration time T of a single camera, as in the point sampling, reduces the motion blur, but results in the aliasing, because the frame rate is not increased. Similarly, the interleaving frames from N cameras as in the box sampling, increases the frame time in the output video, but temporal blur remains due to relatively large integration time.

Accordingly, the goal of temporal SR is to both reduce the aliasing and the blur in the reconstructed output video.

SUMMARY OF THE INVENTION

It is an object of the invention to provide a method for generating an output video from a set of input videos acquired concurrently of a scene by a set of cameras, wherein the output video has a first temporal resolution, and each input videos has a second temporal resolution, which is less than the first temporal resolution.

It is further object of the invention to process independently corresponding frames acquired by each camera to produce frames of the output video.

It is further object of the invention to optimize a signal-to-noise ratio (SNR) of the output video.

It is further object of the invention to optimize light throughput of the output video.

It is further object of the invention to generate a code of sampling, which minimizes a mean square error of the output video.

It is further object of the invention to utilize conventional off-the-shelf cameras to produce the output video with the high temporal resolution.

The embodiments are based on a realization that the coded sampling results in an invertible block diagonal sampling matrix. Thus, code sampled frames of low temporal resolution videos can be combined to produce the output video with the high temporal resolution.

One embodiment of the invention discloses a method for generating an output video having a first temporal resolution from input videos acquired synchronously of a scene by at least three cameras, wherein each input video has a second temporal resolution, wherein the second temporal resolution is less than the first temporal resolution. The method obtains frames of each input video, wherein the frames are sampled according to a code selected such that an integration time of the corresponding camera is greater than a frame time of the output video. Next, the method combines intensities of pixels of corresponding frames in a linear system; and solves the linear system independently for each corresponding frame to generate the output video.

Another embodiment discloses a method for generating an output video having a first temporal resolution from input videos having a second temporal resolution less than the first temporal resolution. The method includes steps of obtaining frames of the input videos acquired synchronously of a scene by at least three cameras, wherein the cameras are coded exposure cameras, and wherein the frames are code sampled according to a code; and combining the code sampled frames to produce the output video.

Yet another embodiment discloses a system for generating an output video having a first temporal resolution from input videos having a second temporal resolution less than the first temporal resolution. The system includes at least three cameras, wherein the cameras are coded exposure cameras configured to acquire synchronously frames of the input video, wherein the frames are code sampled according to a code; and a processor configured to combine the frames producing the output video.

BRIEF DESCRIPTION OF THE DRAWINGS

FIG. 2 is a block diagram of a method for generating an output video having a high temporal resolution from multiple input videos having low temporal resolutions according to various embodiments of the invention.

DETAILED DESCRIPTION OF THE PREFERRED EMBODIMENT

Figure 1A:
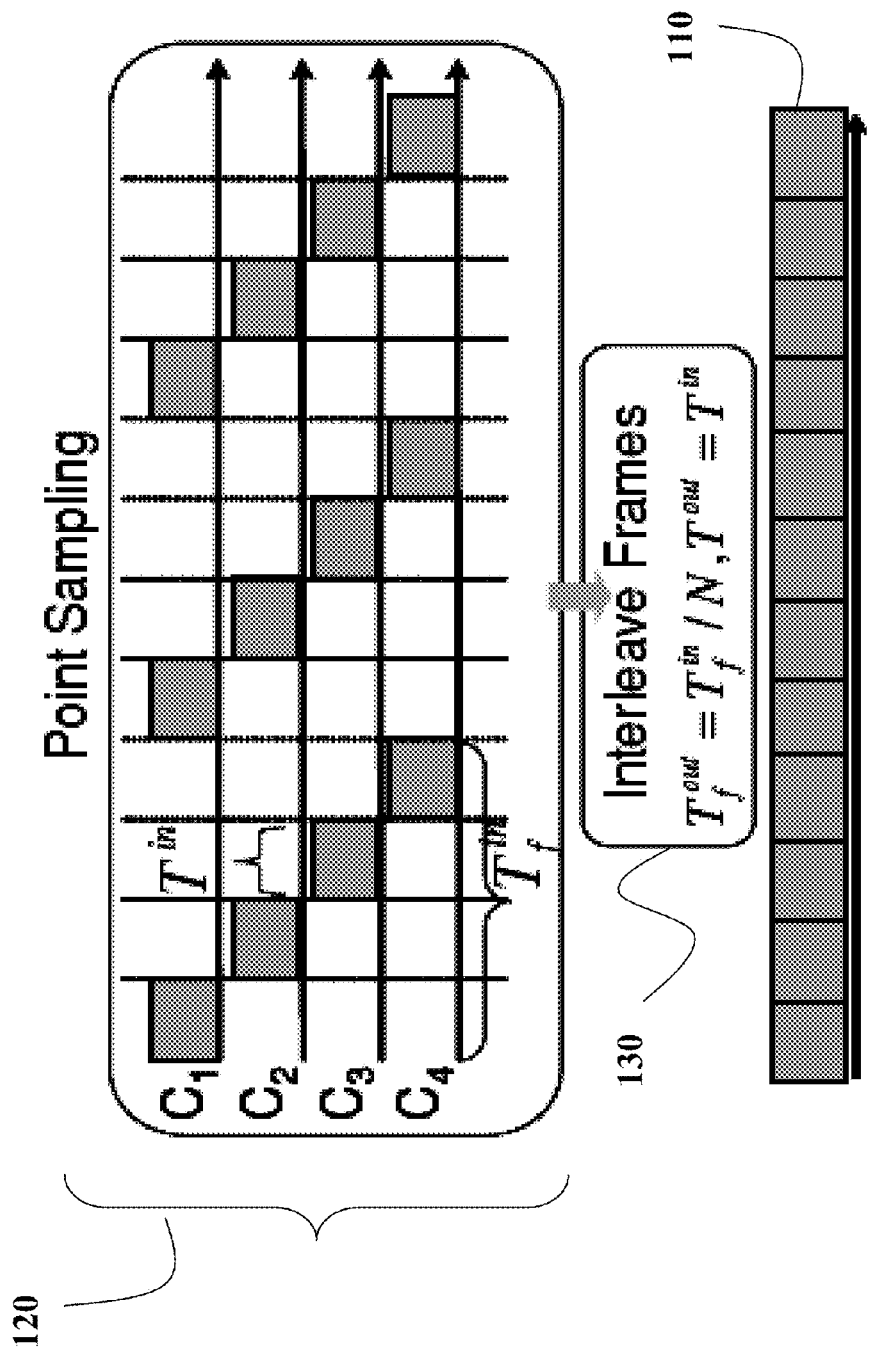
FIG. 1A-1B are block diagram of conventional point and box sampling methods, respectively, for generating an output video having a high temporal resolution from multiple input videos having low temporal resolutions.
Figure 1B:
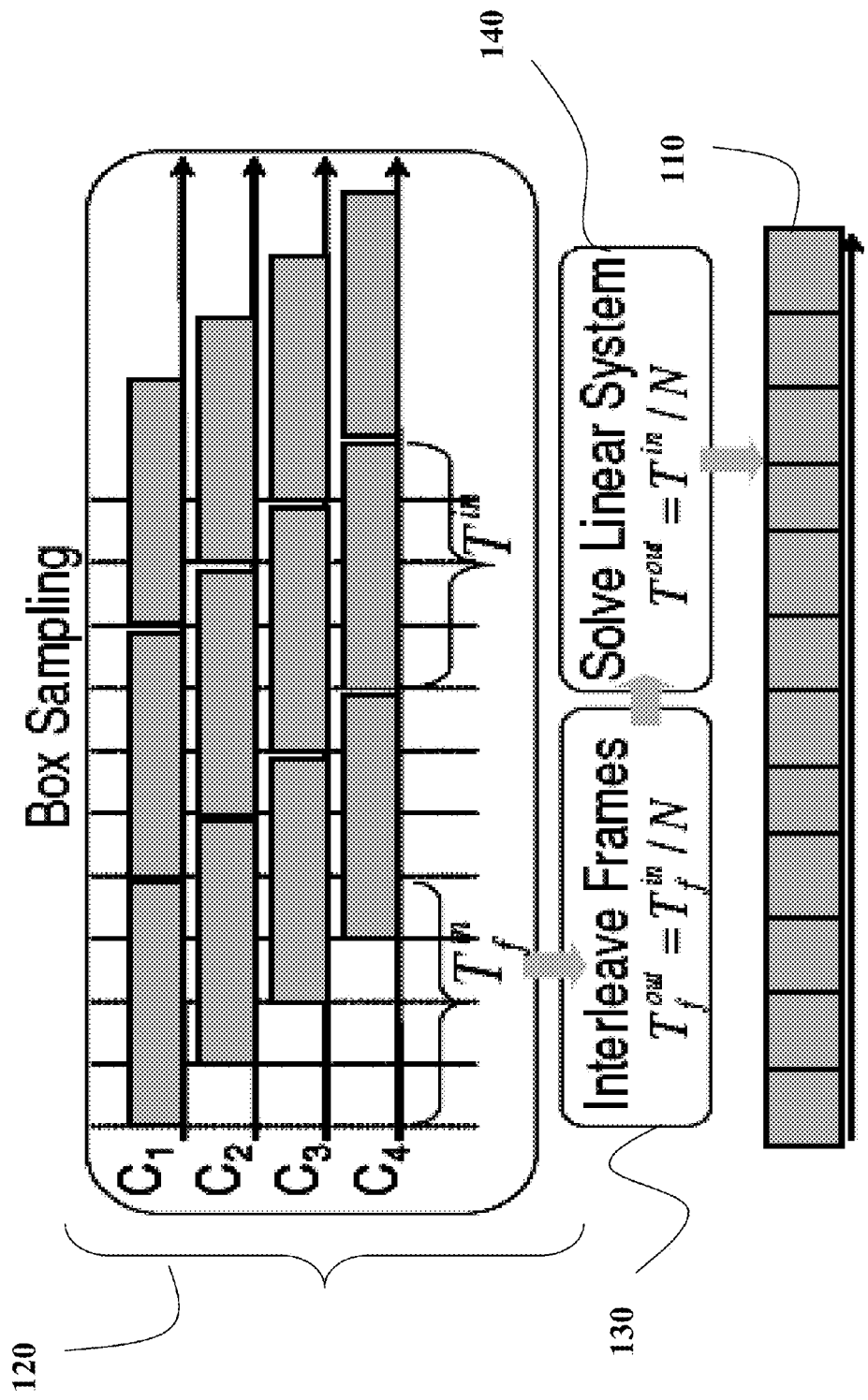
Figure 3:
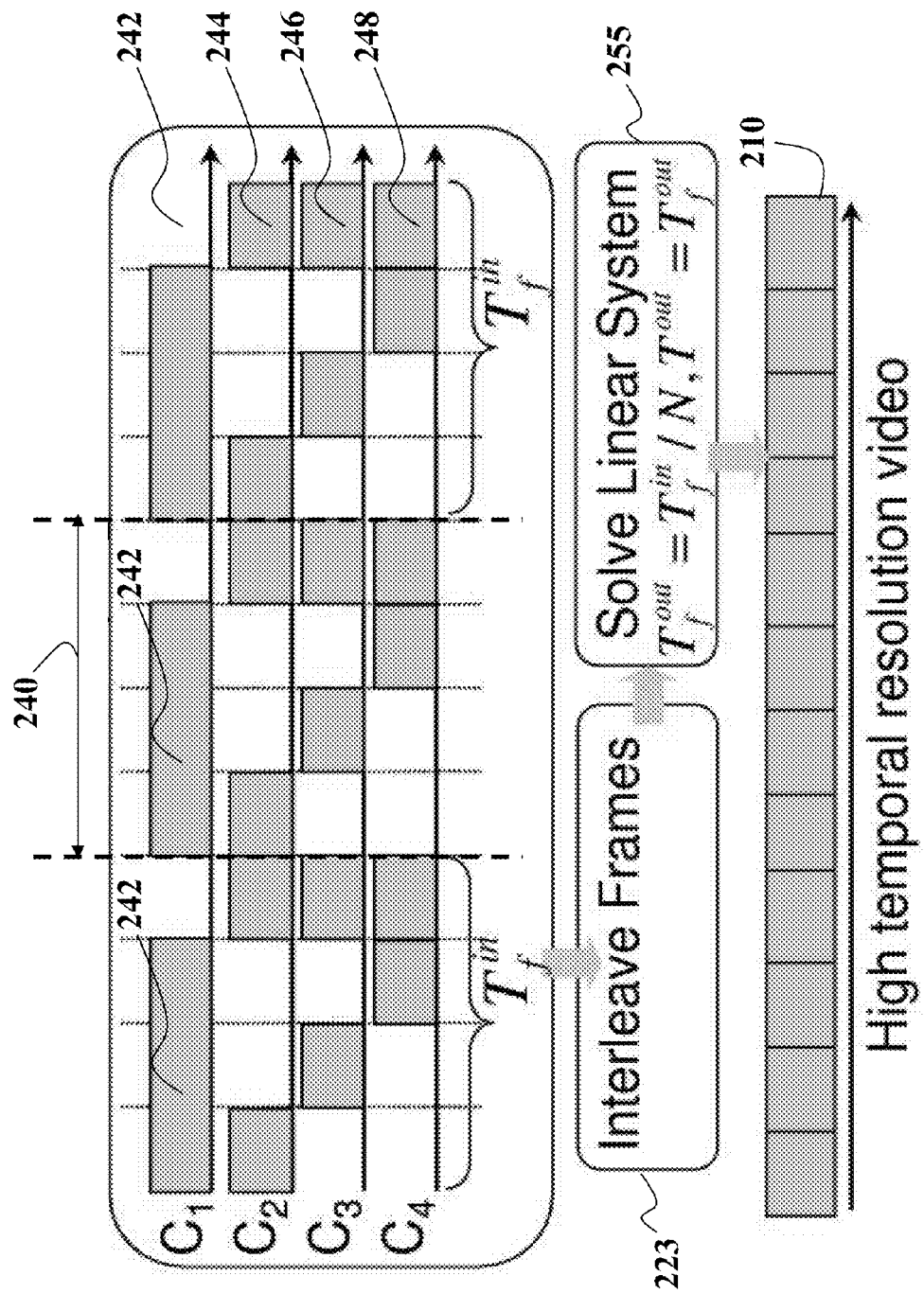
FIG. 3 is a block diagram of the processing of frames according to one embodiment of the invention.

FIG. 2 shows a method 200 for generating an output video 210 having a first temporal resolution from input videos 225. The input videos are acquired synchronously of a scene 202 by a set of cameras 220. In one embodiment, the set of cameras includes at least three cameras. In another embodiment, the plurality of cameras includes at least four cameras.

In one embodiment, the cameras are coded exposure cameras. A coded exposure camera can preserve high spatial frequencies in a motion-blurred image and make the deblurring process well-posed, see U.S. Pat. No. 7,580,620, "Method for Deblurring Images using Optimized Temporal Coding Patterns" issued to Raskar et al. on Aug. 25, 2009, and incorporated hearing by reference.

Each input video 222, 224, 226, 228 has a second temporal resolution, wherein the second temporal resolution is less than the first temporal resolution. Frames 225 of the input videos are code sampled according to a code 230. The code is described by a binary matrix 235. Each row in the binary matrix is a unique code sequence, e.g., the code sequences 242, 244, 246, 248, determined 270 such that an integration time of each camera is greater than a frame time of the output video. In one embodiment, the integration time of each camera is at least N/2 times greater than the frame time of the output video, wherein N is the number of cameras, as described in more details below.

In various embodiments, the cameras and/or the acquired frames of the videos are geometrically and/or computationally aligned. For example, one embodiment includes a housing (not shown) configured to align the cameras geometrically and/or optically with each other.

The frames 227 of the input video is code sampled according to an identical code sequence 242. However, each frame of corresponding frames 240 of the input videos is code sampled according to a different code sequence, e.g., 242, 244, 246, and 248. In alternative embodiment, at least to input videos are code sampled according to an identical code to increase spatial super-resolution, and/or to determine geometric registration parameters. As described herein, the corresponding frames are formed by one frame of each input video acquired synchronously by each camera at an instant in time.

Intensities 223 of pixels in the frames are combined 250 into a linear system 255. The linear system is solved 260 to produce the output video 210. In one embodiment, the linear system is solved independently for each of the corresponding frames.

Interleaved Video

One embodiment uses N co-located cameras so that their optical axes are substantially aligned in the scene. For example, the optical axes of the cameras are aligned by using beam-splitters. Additionally and/or alternatively, the frames acquired by the cameras are registered using planar homographies.

Each camera has an identical frame time $T_f^{in}$, wherein $T_s^i(k)$ and $T_e^i(k)$ are a start and an end of the integration time, respectively, of the camera 1 for a frame k. The cameras start integration at the same time, therefore $T_s^i(k)=k*T_f^{in}$. The input video of the $i^{th}$ camera is described by a vector $v_i(x, y, k)$.

An interleaved video $u(x, y, k)$ is defined as the video obtained by temporally interleaving the corresponding frames of the input videos $$u(x, y, k) = v_a(x, y, b), \quad (1)$$

$$b = \left\lfloor \frac{k}{N} \right\rfloor, a = k - Nb.$$

If the start of integration is interleaved uniformly according to $$T_s^i(k)=kT_f^{in}+iT_f^{in}/N, \quad (2)$$

then the interleaved video has a smaller frame time of $T_f^{out}=T_f^{in}/N$. However, the integration time for the interleaved video, can be larger than the frame time, which is not possible for a conventional camera.

Frame Independent Sampling

As described herein, $T_s(k)$ and $T_e(k)$ are lower and upper bounds of the integration time of the corresponding frames of the cameras, i.e., $$T_s(k)=\min_i T_s^i(k), \text{ and } T_e(k)=\max_i T_s^i(k).$$

Some embodiments of the invention use frame independent sampling (FIS), wherein $T_s(k+1)>T_e(k)$ for all frames k. Thus, for the FIS, the temporal information in the corresponding frames is not shared across other frames and reconstruction of the output video is performed independently for the corresponding frames. For example, the conventional box sampling method cannot be performed independently for the corresponding frames, thus requiring additional computational resources.

Sampling Matrices and Linear System

The sampling methods can be described in terms of a linear system constrained by a sampling matrix A, which describes the relationship between the N input videos and the output video. A vector s is an intensity vector of a pixel in the output video at integration time $T^{out}$. The vector u is the interleaved vector for the pixel, obtained by combining corresponding pixels from each camera according to Equation (1). The sampling matrix A relates the input videos and the output video according to $$u=As. \quad (3)$$

For example, the conventional point sampling can be described by the identity sampling matrix A of size N*N for every N interleaved frames. For example, for N=4, $$u(k) = \begin{bmatrix} v_1(k) \\ v_2(k) \\ v_3(k) \\ v_4(k) \end{bmatrix} = \begin{pmatrix} 1000 \\ 0100 \\ 0010 \\ 0001 \end{pmatrix} s(k). \quad (4)$$

Each camera samples the high resolution video at a distinct time instant. Each 1 or 0 of the sampling matrix corresponds to a sample in the output video at integration time $T^{out}$. For K video frames from each camera, the resulting sampling matrix A matrix corresponds to an identity matrix $I_{NK*NK}$, which is block diagonalized by $I_{N*N}$.

Similarly, for the box sampling, the sampling matrix (N=4) corresponds to $$u = \begin{bmatrix} 1 & 1 & 1 & 1 & 0 & 0 & 0 & 0 & 0 \\ 0 & 1 & 1 & 1 & 1 & 0 & 0 & 0 & 0 \\ 0 & 0 & 1 & 1 & 1 & 1 & 0 & 0 & 0 \\ 0 & 0 & 0 & 1 & 1 & 1 & 1 & 0 & 0 \\ 0 & 0 & 0 & 0 & \ddots & \ddots & \ddots & \ddots & 0 \end{bmatrix} s. \quad (5)$$

However, this sampling matrix does not have independent blocks of size N*N. Furthermore, the linear system of Equation (5) is ill-posed.

Coded Sampling

The embodiments of the invention are based on a realization that the coded sampling results in an invertible block diagonal sampling matrix. One embodiment determines the code minimizing mean square error (MSE) during reconstructing the output video s from the interleaved video vector u.

Assuming independent and identically distributed (i.i.d.) zero mean Gaussian noise with variance $\sigma^2$ in the vector u, the maximum-likelihood (ML) estimate of the output video $\hat{S}$ is determined according to $$\hat{s}=(A^TA)^{-1}A^Tu. \quad (6)$$

where T is the transpose operator

Thus, a covariance matrix $\Sigma$ of the error $S-\hat{S}$ in the estimate output video is determined according to $$\Sigma = \sigma^2(A^TA)^{-1}A^TA(A^TA)^{-1} = \sigma^2(A^TA)^{-1}. \quad (7)$$

The MSE increases by a factor $F=\text{trace}(A^TA)^{-1}/n$, where n is the size of the vector u, and the function trace sums the elements on the main diagonal of the matrix.

The matrix A, which minimizes the MSE, is referred to herein as a S-matrix. If N+1 is divisible by 4, then the rows of the S-matrix correspond to Hadamard codes of length N+1. For the S-matrix, the increase in noise $$F = \frac{4N}{(N+1)^2},$$

which is less than 1, indicating a multiplex advantage.

In various embodiments, the code for the coded sampling is determined based on the S-matrix. The S-matrix is invertible, and each value in the S-matrix is either 0 or 1. Hence, each row of the S-matrix corresponds to a binary on/off sequence of the coded exposure camera. Each bit of the code sequence corresponds to a sample in the output video, and, accordingly, the integration time $T^{out}$.

A value equals to one of the code sequence indicates that a shutter of the camera is kept transparent for the integration time $T^{out}$ and a value equals to zero indicates that a shutter of the camera is kept opaque for the integration time $T^{out}$. Each code sequence has at least (N+1)/2 values equal to one such that each camera integrates at least (N+1)/2 times more light compared to an equivalent high speed camera. In one embodiment, the code sequence has at least two values equal to one, and at least one value equals to zero.

Code Search

The embodiments determine the code for all number of cameras N. One embodiment searches all possible binary matrices and selects the code resulting in a lowest increase in the noise F of the output video. In order to have at least 50% light throughput, each code sequence of the code has at least (N+1)/2 values equal to one. For example, for the number of cameras N=4, one embodiment search $2^{16}$ codes and selects the code described by a binary matrix C according to $$C = \begin{bmatrix} 1 & 1 & 1 & 0 \\ 1 & 0 & 0 & 1 \\ 0 & 1 & 0 & 1 \\ 0 & 0 & 1 & 1 \end{bmatrix}. \quad (8)$$

For K frames, the sampling matrix $A_{4K*4K}=\text{kron}(I_{K*K},C)$, where the function kron denotes a Kronecker product ⊗.

Another embodiment performs a randomized greedy search similar to the search for best motion deblurring code described in U.S. Pat. No. 7,580,620, incorporated herein by reference. Yet another embodiment uses non-binary code sequences.

Invertible Codes with Continuous Blur

In some embodiments, the coded sampling leads to discontinuous blur in acquired frames. However, in these embodiments, each camera starts and stops integration multiple times within the exposure time according to the code. The example of cameras used by the embodiments is "Dragonfly2" CCD FireWire camera manufactured by Pointgrey Research Inc., Richmond, BC, Canada.

However, other embodiments account for a fact that several machine vision cameras do not allow abrupt integration. Such cameras often support external triggering followed by a continuous integration time. Accordingly, the code sequences in these embodiments include only continuous codes, i.e., the values equal to one are positioned continuously. An example of such code is a lower triangular matrix $$\begin{bmatrix} 1 & 0 & 0 & 0 \\ 1 & 1 & 0 & 0 \\ 1 & 1 & 1 & 0 \\ 1 & 1 & 1 & 1 \end{bmatrix}.$$

The reconstruction noise of the coded sampling using the code described by the triangular matrix is greater than the noise of the optimal sampling by 4 dB only for N=4. However, triangular codes require a large dynamic range, since the exposure time between cameras changes by a factor of N.

Accordingly, one embodiment searches for the code having continuous values of ones, such that each coded sequence has at least 50% light throughput.

For each camera, the code sequence can have N/2, N/2+1, ..., N ones, which can occur in N/2+1, N/2, ..., 1 places, respectively. Therefore, the possible code choices for a single camera are $$c = \frac{(N+2)(N+4)}{8}.$$

The total search space is thus c*N. For N=4, the code matrix with minimum MSE is, e.g., $$\begin{bmatrix} 1 & 1 & 0 & 0 \\ 1 & 1 & 1 & 0 \\ 0 & 1 & 1 & 0 \\ 0 & 1 & 1 & 1 \end{bmatrix}. \quad (9)$$

Because each code sequence has continuous values of ones, the box blur occurs, but the linear system is well-posed. For N=4, these codes are better than box sampling by 10 dB. These codes can also be thought of as conventional cameras with varying exposure and start times.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for generating an output video having a first temporal resolution from input videos acquired synchronously of a scene by at least three cameras, wherein each input video has a second temporal resolution, wherein the second temporal resolution is less than the first temporal resolution, comprising the steps of:
obtaining frames of each input video, wherein the frames are sampled according to a code selected such that an integration time of the corresponding camera is greater than a frame time of the output video;
combining intensities of pixels of corresponding frames in a linear system; and
solving the linear system independently for each corresponding frame to generate the output video.

2. The method of claim 1, wherein the code includes code sequences, and wherein each frame of the input video is code sampled according to an identical code sequence, and each frame of the corresponding frames of the input videos is code sampled according to a unique code sequence.

3. The method of claim 1, wherein the cameras are coded exposure cameras.

4. The method of claim 1, further comprising:
determining the code that minimizes a mean square error in the output video.

5. The method of claim 1, further comprising:
determining the code based on a S-matrix, wherein the S-matrix is invertible and each value in the S-matrix is either zero or one, and rows in the S-matrix correspond to Hadamard codes.

6. The method of claim 1, further comprising:
keeping a shutter of the camera transparent for an integration time indicated by a value of the S-matrix equal to one; and
keeping the shutter of the camera opaque for the integration time indicated by the value of the S-matrix equal to zero.

7. The method of claim 1, wherein the code includes code sequences, further comprising:
determining a code sequence having at least two values equal to one, and at least one value equals to zero.

8. The method of claim 7, wherein the input videos are acquired by N cameras, further comprising:
determining the code sequence having at least N/2 values equal to one.

9. The method of claim 7, wherein the input videos are acquired by N cameras, further comprising:
determining the code sequence having at least (N+1)/2 values equal to one.

10. The method of claim 1, further comprising:
determining the code based on a search among all possible combination of code sequences of the code, such than each code sequence has at least (N+1)/2 values equal to one, wherein N is a number of the cameras, and wherein the code results in a lowest increase in noise of the output video.

11. The method of claim 1, further comprising:
determining the code based on a randomized greedy search.

12. The method of claim 1, further comprising:
determining the code including code sequences, wherein values of each sequences are either zero or one, such that all values equal to one are positioned continuously in the code sequence.

13. The method of claim 12, wherein the code sequence has at least two values equal to one, and at least one value equals to zero.

14. The method of claim 1, wherein the code includes code sequences, and wherein each frame of at least two input videos are code sampled according to an identical code sequence, further comprising:
increasing a special resolution of the output video.

15. A method for generating an output video having a first temporal resolution from input videos having a second temporal resolution less than the first temporal resolution, comprising the steps of:
obtaining frames of the input videos acquired synchronously of a scene by at least three cameras, wherein the cameras are coded exposure cameras, and wherein the frames are code sampled according to a code; and
combining the code sampled frames to produce the output video.

16. The method of claim 15, wherein the code is selected such that an integration time of the cameras is greater than a frame time of the output video.

17. The method of claim 15, further comprising:
combining corresponding frames independently.

18. A system for generating an output video having a first temporal resolution from input videos having a second temporal resolution less than the first temporal resolution, comprising:
  at least three cameras, wherein the cameras are coded exposure cameras configured to acquire synchronously frames of the input video, wherein the frames are code sampled according to a code; and
  a processor configured to combine the frames producing the output video.

19. The system of claim 18, further comprising:
  means for aligning optical axes of the cameras.

20. The system of claim 18, further comprising:
  means for determining the code.

* * * * *